Aug. 9, 1966  V. S. WINCE  3,265,887
LUMINAIRE
Filed April 23, 1965  2 Sheets-Sheet 1

INVENTOR.
VEARL S. WINCE
BY
Nolte & Nolte
ATTORNEYS

INVENTOR.
VEARL S. WINCE
BY
Nolte & Nolte
ATTORNEYS

United States Patent Office 3,265,887
Patented August 9, 1966

3,265,887
LUMINAIRE
Vearl S. Wince, Newark, Ohio, assignor to Holophane Company, Inc., New York, N.Y., a corporation of Delaware
Filed Apr. 23, 1965, Ser. No. 450,327
20 Claims. (Cl. 240—51.11)

This application is a continuation-in-part of application S.N. 159071, filed December 13, 1961, now abandoned.

The present invention relates to improved constructions for lenses for efficiently distributing light from lighting fixtures while at the same time eliminating unwanted and unpleasant "dark areas" in the end areas of the fixtures.

To obtain the highest output of light in a fixture with units in which linear fluorescent lamps are used, it is customary to extend the light controlling lens substantially to the ends of the fixture, that is, normally to a plane in line with the outer edges of the lamp holders. The brightness of such lamps naturally decreases in the areas near their ends and, because of the non-light-producing parts, such as the end caps on the lamps and the lamp holders, the brightness of the lighted lens also decreases at the ends giving it an unpleasant dark appearance.

It is an object of the invention to produce efficient light distribution at the end portions of such luminaires while at the same time eliminating the unpleasant dark appearance at the end areas of the lens.

It is an object of the invention to eliminate these dark end areas by obscuring non-light-producing fixture and lamp parts by means of lens constructions.

In obtaining the object of the present invention, there are provided means in the end areas of a lens, for the type of fixture described, for scattering some light from the linear light source adjacent the non-light-producing end portions so that the scattered light will be sent in directions which normally appear dark. In the embodiment of the invention to be described, vertical surfaces are provided in the lens to effect reflection of light rays, normally directed away from nadir, in a manner to be directed toward nadir so that a viewer looking at the end of the luminaire, toward the direction of reflection, will not see darkened areas at the end of the luminaire but lighted areas resulting from the reflected rays.

A further and coincidental problem of light-transmitting elements which have prismatically formed light emergent surfaces is that although the prisms are effective to "cut-off" light which would otherwise be emitted at glare angles, still, when viewed at certain angles the light is still far too bright and still produces undesirable glare. Such light-transmitting elements conventionally have a flat light-incident surface with the opposed light-emissive surface made up of a plurality of identical intersecting pointed projections which may, for example, have the configuration of cones, pyramids, or the like. The light which reaches the light-incident surface will pass into the light-transmitting element and some of this light will engage the projections at directions which allow part of the light to be reflected within the lens, as desired, but eventually to be reflected out of the prisms at glare angles. The greater part of such light is initially reflected by the prism surfaces back up to the flat light-incident surface where it is then reflected down onto another projection where a part of the light is refracted out at an undesirable angle and the remainder is internally reflected. This continues for several inches through the light-transmitting element until eventually these rays are all emitted or absorbed by the light-transmitting element. This action of the light is what makes the light-transmitting element brighter than desired in the normal viewing angles, or in the so called glare angle zone of 60° to 90° from nadir.

A further object of the invention is to provide a light-transmissive element which will eliminate objectionable glare of the type referred to above.

With particular reference to the "glare" problem, the light-transmitting element is formed with a network of grooves extending into the element from its flat, light-incident surface. The sides of these grooves act to reflect near-vertical entering, or internally reflected, light by changing its direction of travel, but otherwise not changing its normal emergent angle.

The grooves may contain an opaque or semi-transparent material, preferably out of optical contact with the groove sides, and, which will absorb the light which is internally reflected at angles at which the groove sides would not perform the reflecting function. Preferably the material in the grooves is, at its upper surface, substantially flush with the light-incident surface of the light-transmitting element.

The grooves are aligned with the valleys defined between the pointed projections at the light-emissive surface of the light-transmitting element so that when viewed from directly below the grooves and the material, when used, are invisible. In addition the material in the grooves may be colored, such as a pleasant shade of blue, which can be seen when viewed at diagonal angles. Although other colors may be used, blue is preferred because it is restful and pleasing to the eye.

The invention will be better understood by a reading of the following detailed description of specific embodiments thereof taken together with the accompanying drawings, wherein.

Figure 1:
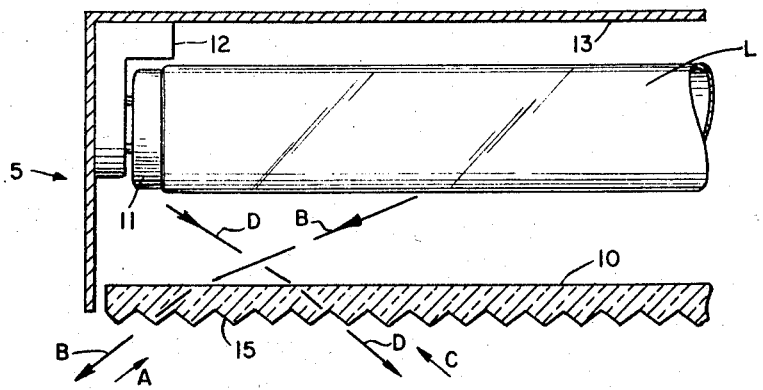
FIG. 1 is a vertical longitudinal sectional view partly broken away and taken through a luminaire of the type described.

Referring first to the fixture 5 of FIG. 1, a conventional cut-off lens 10 extends beneath a linear fluorescent lamp L and extends directly below the end cap 11 thereof and the adjacent lamp holder 12 which supports the lamp L within the fixture pan 13 at one end thereof.

The lens 10 is provided with conventional cut-off prisms 15, the light directing activity of which does not prevent an area of darkness at the end of the luminaire which varies depending on the viewing direction. As shown in FIG. 1, when viewing the end of the lens in direction A, the darkness is negligible because of light transmitted from high brightness areas of the lamp, as shown by ray B. When viewed from the opposite direction C however, the lens appears much darker at the end portion since there is very little or no light in the direction of ray D. In directions at right angles to the directions A and C, the density of the dark pattern lies between these two extremes.

Improvement in appearance at the end of the fixture 5 without affecting the efficient light distribution of the lens is effected according to the invention by providing vertical surfaces (FIG. 2) in a lens body 20 so as to reflect and scatter the light into directions which normally appear dark as, for instance, direction C in FIG. 1, whereby the non-light-producing parts 11 and 12 of the fixture 5 are obscured.

The cut-off prisms 21 are in the shape of cones and these perform their normal light directing functions. Besides these cone formations 21, small cylindrical depressions 22 extend inwardly from the bottom surface of the lens body 20 and these comprise the vertical surfaces which reflect rays of light from the source as shown by arrows 23 and 23'. Reflection occurs because the vertical surface is disposed at the angle of reflection relative to a great number of rays coming from the linear light source.

Figure 2:
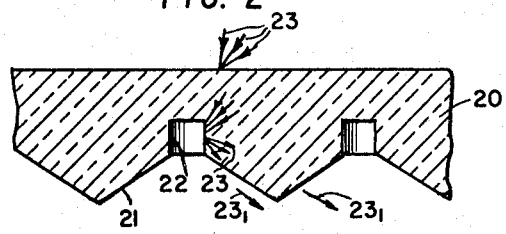
FIG. 2 is an enlarged and broken away longitudinal sectional view through a lens in which is embodied the present invention.
Figure 3:
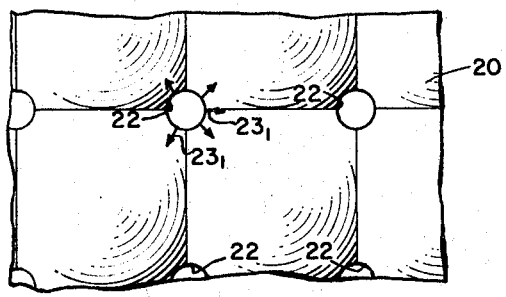
FIG. 3 is a bottom plan view, broken away, of the lens of FIG. 2.
Figure 4:
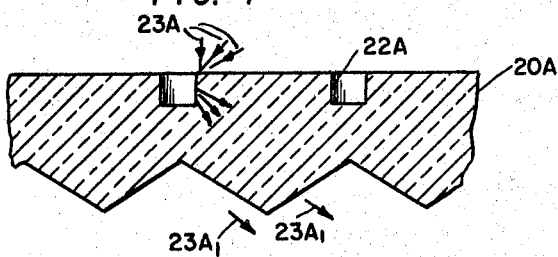
FIG. 4 is a longitudinal sectional view, similar to FIG. 2, taken through a lens and showing a modification of the invention.

In FIG. 4, it is seen that instead of forming depressions at the bottom surface of the lens, depressions 22A are made to extend downwardly from the top face of the lens 20A and the rays 23A and 23A' will be directed in the same manner as 23 and 23' in FIGS. 2 and 3.

Figure 5:
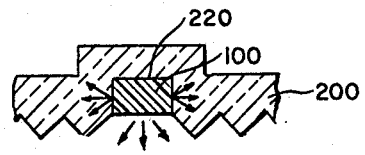
FIG. 5 is a longitudinal sectional view, similar to FIGS. 2 and 4, taken through a lens and showing a further modification of the invention.
Figure 6:
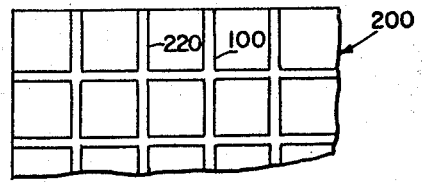
FIG. 6 is a bottom plan view of the lens of FIG. 5.

FIG. 5 shows another construction utilizing the present invention wherein depressions 220 extending from the outer face of the lens 200 are filled with opal plastic 100. The depressions 220 are arranged to extend in a grid pattern as shown in FIG. 6. In operation, light striking the opal plastic 100 is scattered in all directions as shown by the arrows in FIG. 5 and in a manner similar to the light reflecting and scattering procedures shown in FIGS. 2–4.

Referring now to FIGS. 7–10, a light-transmitting element 30 is shown which may be identical at its outer periphery with the light-transmitting element 10 of FIG. 1. However, the light-transmitting element 30 is formed at its light-incident surface 42 with a plurality of grooves 32 which extend into the element 30 for a considerable substantial depth, as is apparent in FIGS. 8 and 9, and within the grooves 32 is located a light reflective material 34 having a relatively low reflection factor, which will shield against light-ray radiation at angles which otherwise would produce undesirable glare. All rays which are reflected from the sides of the grooves merely have their direction altered from right to left or vice versa. Such direction change does not affect the overall function of the lens panel. Rays which strike the sides of the grooves in near-horizontal directions, however, are not reflected, but are transmitted through the sides, and if no material is placed in the grooves, this light continues on unaltered in direction. This is the light which ultimately is emitted, bit by bit, into glare angles and is therefore undesirable. By placing into the grooves some material which absorbs part or all of the near-horizontal rays, the glare angle light is reduced or eliminated.

Figure 7:
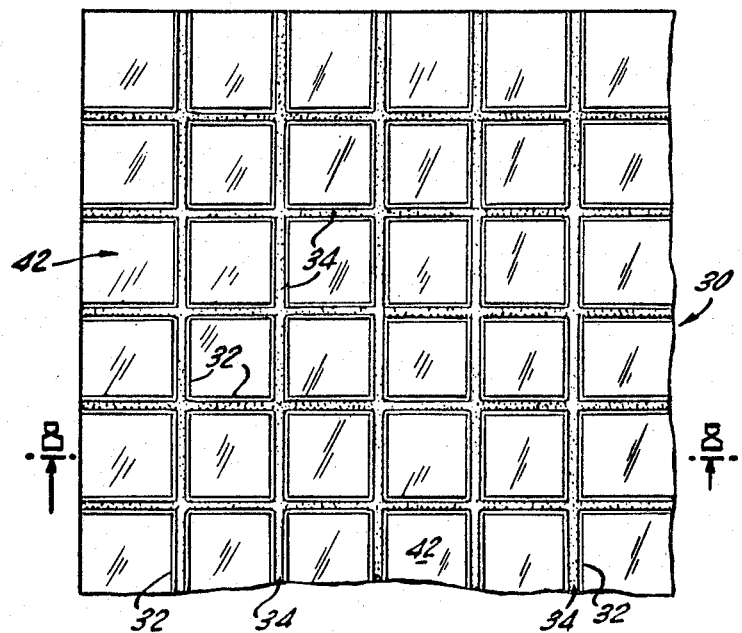
FIG. 7 is a fragmentary top plan view of another embodiment of a structure according to the invention.

The light-transmitting element 30 has material 34 located in the grooves 32 in such a way that the material 34 has, at the transmitter's light-incident surface 42, an upper surface 36 which forms a grid as shown in FIG. 7, and this grid is flush with the light-incident surface 42 and at this surface is flat and in the form of elongated narrow intersecting bands.

The element 30 has light-controlling elements 38 at its light-emergent surface, and these elements 38 may be in the form of substantially conical projections or these projections 38 may have the configuration of pyramids. In any event, the pointed projections 38, which form the light-controlling elements, are all identical and intersect each other to form between themselves elongated intersecting rows of valleys 40, and the grid of grooves 32 is aligned with the intersecting valleys. The valleys 40 thus are in alignment with and located directly beneath the grid of grooves 32 and thus beneath the network of material 34 which has its upper surface 36 flush with the light-incident surface 42 of the element 30.

Figure 10:
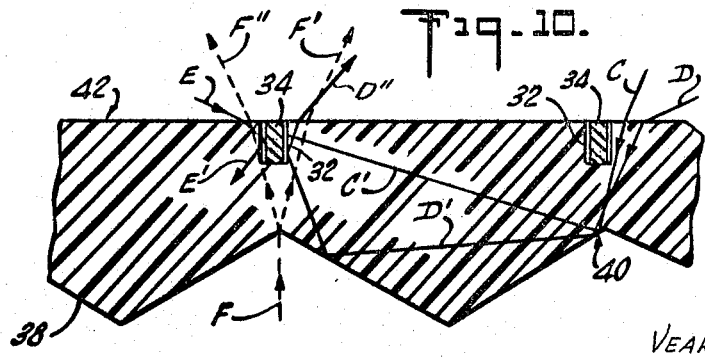
FIG. 10 illustrates, on an enlarged scale as compared to FIGS. 8 and 9, how the structure of the latter figures operates to eliminate glare.

Referring to FIG. 10, light rays such as the rays C and D enter into the material of the light-transmitting element 30, which may be made of glass, plastic, or the like, at such an angle that when they strike a surface of a projection 38, they will be directed either to an opposite surface of the same projection, as ray D', or directly back up to the light-incident surface 42, as ray C'.

Thus, it will be seen that the ray D, D', D'' of FIG. 10 will strike the surfaces of the projection 38 which then reflects upwardly at a relatively sharp angle back toward the light-incident surface 42. On the other hand, ray C, C' extends from its initial reflection with the projection 38 at a relatively flat angle back toward the surface 42. A ray such as the ray C which misses the opposed surface of the pointed projection would ordinarily continue on to be reflected again internally by the incident surface 42. Such twice reflected light generally strikes the projections at the light-emergent surface again, but, in directions which allow part of the light to be refracted out of the projection at glare angles. Even so, the greater part of such light is again reflected up to the surface 42 and down to another pointed projection where again a small part is refracted out at a high angle and a remainder is again internally reflected. This action continues for several inches through the light-transmitting lens until eventually the rays are all emitted or absorbed by the lens. Such behavior of the light makes the light-transmitting lens brighter than desired in the normal viewing angles, or in the so-called glare angle zone of 60° to 90° from nadir.

Figure 8:
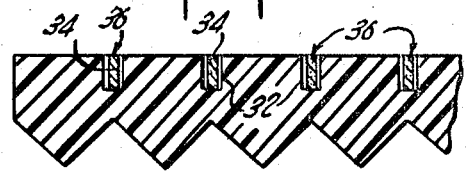
FIG. 8 is a fragmentary sectional elevation taken along 8—8 of FIG. 7 in the direction of the arrows.

The structure of FIGS. 7–10 will reduce this objectionable light considerably by the presence of the grid of grooves of the invention. The material 34 in the grooves of FIGS. 7, 8 and 10, is an opaque material which does not make optical contact with the sides of the grooves. With this construction, near-horizontal rays such as the rays of the type indicated at C' will be intercepted and absorbed in part or entirely by the material. Other rays, such as the rays D, D', D'' which normally are reflected upwardly into the fixture and E–E' which are normally refracted or reflected in useful directions, merely have their direction changed when reflected by the groove as shown at D'' and as at E'.

Inasmuch as the gird follows the pattern made by the valleys of the pointed projections, when viewing the light-transmitting lens from directly below, the grid is obscured by the refracting action of the sides of the pointed projections, shown by the viewing lines F–F'–F''.

As shown in FIGS. 7, 8 and 10, the material 34 which fills the grooves 32 is relatively rigid network of opaque bars, set into the grooves. Where the material is to be transparent or semi-transparent, it can be composed of granular material suitably bonded and can be provided with a color, so that when viewed from diagonal angles, a pleasant shade will appear to the eye of the observer. A very pleasing color is blue.

Figure 9:
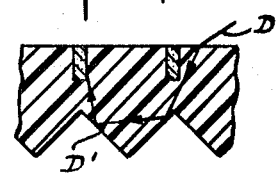
FIG. 9 is a fragmentary sectional elevation of an embodiment slightly different from that shown in FIG. 8.

When transparent or semi-transparent material is used, it is best to provide for shrinkage of the material depositing it in the grooves so that it will be, for the most part, out of optical contact with the groove sides and this permits the groove to perform the above functions. In the case of optical contact of the groove and groove material, as shown in the modification of FIG. 9, rays such as D' would be absorbed in the material. Of course, some contact of the material with the sides should be permitted in any case so as to ensure stability of the material in the groove.

Moreover, it is not essential that the pointed projections 38 of conical or pyramidal configuration be formed as extending outwardly of the light-emergent surface. For example, the bottom surface of the light-transmitting element 30 can be provided with conical or pyramidal depressions which extend onto the element from its bottom surface. In such an instance, the sides of these depressions are the light-controlling, prismatic portions similar to the light-emergent sides of projections 38.

It is to be understood that a particular embodiment of the invention has been described, and, therefore, its full scope is to be interpreted from the appended claims.

It will be noted that the grooves of the embodiment of FIGS. 7–10 are essentially vertical surfaces and these very same grooves which act to intercept light which has been internally reflected by the prisms 38 also act in the end portions of the refractor lens to redirect light in directions downward and away from the ends in a manner to obscure from an observer the opaque elements of the refractor.

What I claim is:

1. The combination with a luminaire having a light source with opaque elements at each end and mounted adjacent said opaque elements via further opaque elements at each end of the luminaire housing; of a lens comprising an extended piece of transparent material having an upper and lower surface and extending substantially horizontally below the light source and below the opaque elements of said light source and said housing, a plurality of light cut-off prisms covering the lower surface of said lens and directing light in pre-determined patterns, a plurality of vertical surfaces formed in said lens intermediate a plurality of said cut-off prisms, said vertical surfaces occupying the areas at the ends of said lens and below and inwardly of said opaque elements, said vertical surfaces receiving light coming from said light source downwardly and toward said ends and reflecting and scattering said light in directions downward and away from said ends toward the transverse center of the said lens, the direction of said reflected and scattered light being such that an observer in a line of view of said opaque elements, looking upwardly toward a far end of said lens sees said reflected and scattered light instead of said opaque elements.

2. The lens of claim 1 wherein said vertical surfaces extend inwardly from the upper surface of said lens.

3. The lens of claim 1 wherein said vertical surfaces extend inwardly from the lower surface of said lens.

4. The lens of claim 1 wherein said vertical surfaces form recessed means, said recessed means being occupied by opal plastic material.

5. The combination of claim 1 wherein said cut-off prisms internally reflect portions of light which would otherwise be emitted at comparatively high, glare angles, said vertical surfaces comprise intersecting grooves forming a grid pattern extending into the body of said lens from said upper surface, said grid pattern extending over the entire said upper surface, said vertical surfaces further being disposed at such angles as to intercept portions of the light internally reflected by said cut-off prisms.

6. The combination of claim 5, wherein light absorbing material is situated in said grooves.

7. The combination of claim 6, wherein said pattern of grooves includes a first set of parallel grooves extending longitudinally of said lens and a second set of grooves extending perpendicularly with respect to said first set of grooves and transversely across said lens intersecting said first set of grooves.

8. The combination of claim 6, said light absorbing material being opaque.

9. The combination of claim 6, said light absorbing material being translucent.

10. The combination of claim 9, said light absorbing material being plastic and having a blue color.

11. The combination of claim 5, wherein said cut-off prisms define a network of valleys between themselves, and said pattern of grooves is aligned with said valleys.

12. The combination of claim 5, said upper surface of said lens being flat.

13. A light shielding and transmitting element comprising a light incident surface, a light emergent surface, means on the light emergent surface for controlling the distribution of light transmitted through said element, said means including prism means for internally reflecting portions of light which otherwise would be emitted at comparatively high glare angles, a plurality of grooves extending into the body of said element from the light incident surface thereof, said plurality of grooves including a first set of parallel grooves extending longitudinally of said lens and a second set of parallel grooves extending perpendicularly with respect to said first set of grooves transversely across said lens and intersecting said first set of grooves, said grooves including vertical sides, said vertical sides constituting means for intercepting portions of the light internally reflected by said prism means and for reflecting some of said intercepted light back through the light incident surface and for passing some of said reflected light into said grooves, light absorbing material being situated in said grooves.

14. The light shielding and transmitting element of claim 13 wherein said light-absorbing material is opaque.

15. The light shielding and transmitting element of claim 13 wherein said prism means includes a plurality of prisms defining a network of valleys between themselves, and said grooves are aligned with said valleys.

16. The light shielding and transmitting element of claim 13 wherein said light-absorbing material is translucent.

17. The light shielding and transmitting element of claim 16 wherein said prisms define a network of valleys between themselves, said grooves being aligned with said valleys.

18. The light shielding and transmitting element of claim 13 wherein the light absorbing material is situated in said grooves and is substantially out of contact with the sides of said grooves.

19. The light shielding and transmitting element of claim 18 wherein said prisms define a network of valleys between themselves, said grooves being aligned with said valleys.

20. A light shielding and transmitting element comprising a light-incident surface, means for absorbing internal light disposed internally of said light-incident surface, means for refracting light disposed on said light emergent surface and including surface means for directing lines of sight from directly below said light emergent surface away from said absorbing means and for directing lines of sight at oblique angles to said light emergent surface toward said absorbing means, said absorbing means including colored light absorbing material.

References Cited by the Examiner

UNITED STATES PATENTS

| 737,979 | 9/1903 | Wadsworth | 88—60 |
| 2,749,794 | 6/1956 | O'Leary | 88—60 |

FOREIGN PATENTS 590,770   11/1960   Belgium.

NORTON ANSHER, *Primary Examiner.*

C. B. PRICE, *Assistant Examiner.*